United States Patent [19]

Iacovangelo et al.

[11] 4,361,631
[45] Nov. 30, 1982

[54] ELECTRODE MATERIAL FOR MOLTEN CARBONATE FUEL CELLS

[75] Inventors: Charles D. Iacovangelo, Schenectady; Kenneth P. Zarnoch, Clifton Park, both of N.Y.

[73] Assignee: General Electric Company, Schenectady, N.Y.

[21] Appl. No.: 360,073

[22] Filed: Mar. 19, 1982

Related U.S. Application Data

[63] Continuation of Ser. No. 194,474, Oct. 6, 1980, abandoned.

[51] Int. Cl.³ .............................................. H01M 4/86
[52] U.S. Cl. ......................................... 429/40; 429/44
[58] Field of Search ........................ 429/40, 42, 44, 45, 429/102, 209; 252/182.1; 204/290; 75/212

[56] References Cited

U.S. PATENT DOCUMENTS

| | | | |
|---|---|---|---|
| 3,097,115 | 7/1963 | Moos | 429/40 |
| 3,287,737 | 11/1966 | Hintermann et al. | 429/44 |
| 3,400,019 | 9/1968 | Le Duc | 429/42 |
| 3,531,329 | 9/1970 | Selwitz | 429/42 |
| 4,031,291 | 6/1977 | Fullenwider | 429/40 |

Primary Examiner—Anthony Skapars
Attorney, Agent, or Firm—Jane M. Binkowski; James C. Davis, Jr.; Joseph T. Cohen

[57] ABSTRACT

Electrode material composed of metal encapsulated substrate particles for making into an electrode for a molten carbonate fuel cell is produced by electroless plating of a metal electrochemically active for the reactions of the cell onto a substrate particle which is non-sintering at the operating temperatures of the cell.

4 Claims, 1 Drawing Figure

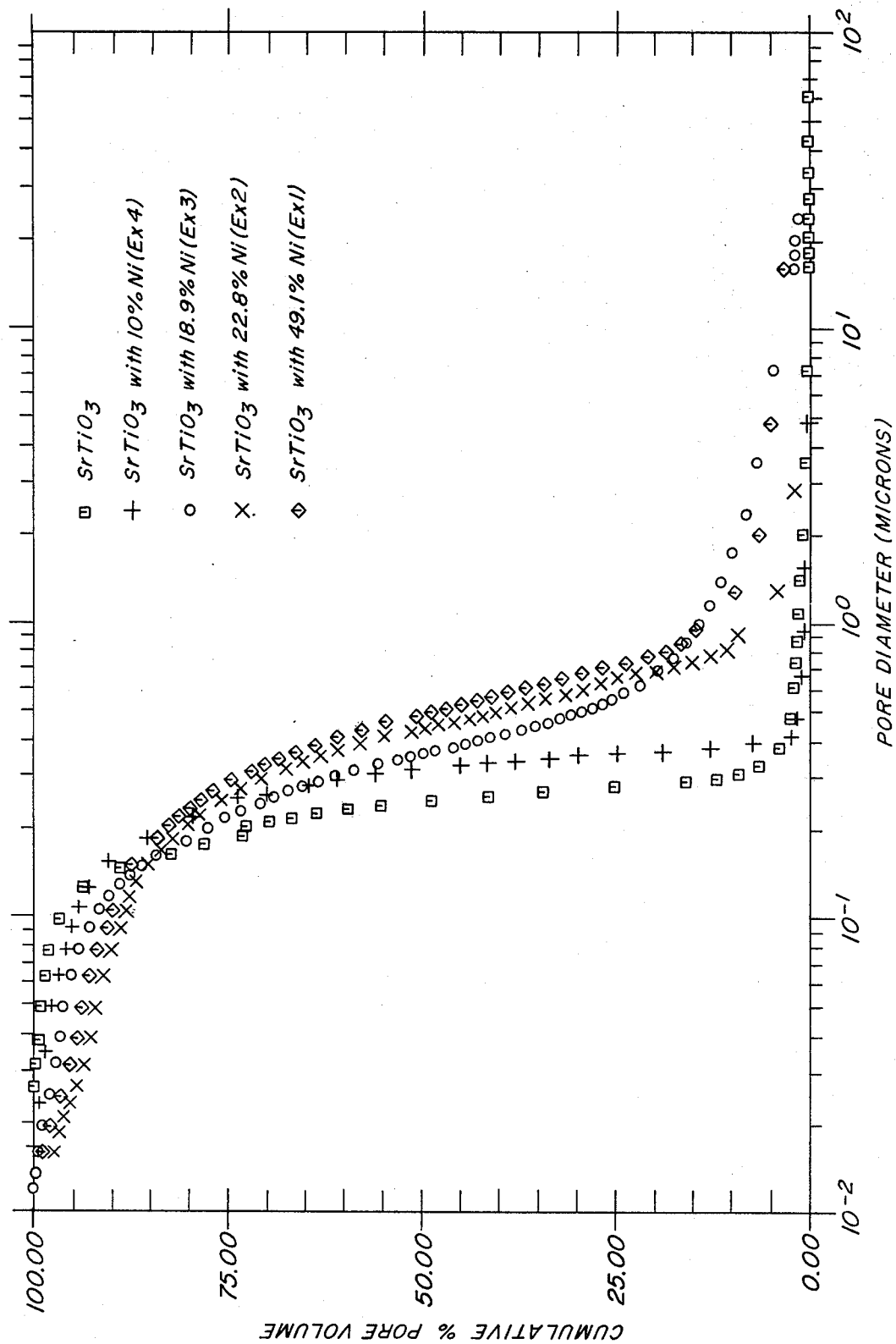

ELECTRODE MATERIAL FOR MOLTEN CARBONATE FUEL CELLS

This application is a continuation, of application Ser. No. 194,474, filed Oct. 6, 1980, now abandoned.

The present invention relates to the production of an electrode material composed of metal encapsulated substrate particles which can be fabricated into an electrode for a molten carbonate fuel cell.

The use of porous nickel sintered plaques as electrodes in molten carbonate fuel cells has been widespread. In general these electrodes are high performance electrodes. These electrodes, however, suffer from two pivotal problems. First of all, is the high cost of nickel and secondly, these electrodes sinter with time resulting in a loss of surface area, altering of the pore size distribution in the plaque and loss of performance over the 50,000 hour required life of an operating cell. The present invention overcomes these problem areas by utilizing metal encapsulated particles.

The significant feature of this new method is to electroless plate metals onto a non-sintering substrate. This reduces the overall cost of the electrode by decreasing the amount of metal (generally nickel) used and replacing it with a low cost material. By plating the metal onto the non-sintering substrate, the morphology does not change with time due to the sintering of the metal.

Those skilled in the art will gain a further and better understanding of the present invention from the detailed description set forth below, considered in conjunction with the figure accompanying and forming a part of the specification, in which:

FIG. 1 is a comparison on a logarithmic scale of the pore size distribution for $SrTiO_3$ with electroless plated nickel/$SrTiO_3$.

The metal in the present invention useful for encapsulating the substrate particle is electrochemically active for the reactions of the molten carbonate fuel cell. At the anode, hydrogen in the fuel gas reacts with carbonate ions from the electrolyte to form water and carbon dioxide:

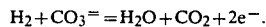

$$H_2 + CO_3^= = H_2O + CO_2 + 2e^-.$$

At the cathode, oxygen and carbon dioxide react to form carbonate via the overall reaction:

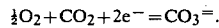

$$\tfrac{1}{2}O_2 + CO_2 + 2e^- = CO_3^=.$$

Representative of useful encapsulating metals are nickel and copper.

Briefly stated, the present invention relates to a method for producing a powder which can be fabricated into an electrode for a molten carbonate fuel cell, said powder being composed of metal encapsulated ceramic substrate particle wherein said metal is electrochemically active for the reactions of said cell and wherein said substrate particles are non-sintering at the operating temperatures of said cell, which comprises providing an electroless plating solution containing ions of the metal to be plated, providing catalyzed ceramic substrate particles, suspending the substrate particles in said solution plating said metal thereon to encapsulate said substrate particle with said metal and recovering said metal encapsulated particles.

The present substrate particles are non-sintering at the operating temperatures of the molten carbonate fuel cell. By non-sintering it is meant that the substrate particles do not bond or fuse directly to each other. Generally, such operating temperatures range from about 600° C. to about 900° C. Representative of the substrate particles useful in the present invention are ceramic materials such as, for example, lithium aluminate, strontium titanate, α-alumina and mixtures thereof.

The size of the substrate particles which are electroless plated depends largely on the thickness of the metal to be deposited thereon and also on the pore size desired in the electrode fabricated therefrom. Generally, the substrate particle ranges in size from about 0.1 micron to about 100 microns, and preferably from about 0.1 micron to 5 microns. In one preferred embodiment of the present invention, substrate particles of plural or distributed size are electroless plated to produce metal encapsulated particles of plural or distributed size wherein the thickness of the encapsulating metal is substantially the same. In another preferred embodiment of the present invention, substrate particles of substantially the same size are electroless plated to deposit the encapsulating metal in a range of thicknesses producing metal encapsulated particles of plural or distributed size. Such electrode powders of distributed or plurality size are useful for fabricating an electrode of distributed or plurality pore size since pore size of the present electrode is largely determined by the size of the metal-encapsulated particles.

Since the substrate particles are ceramic, their surfaces must first be treated with a catalyst to initiate electroless deposition. Preferably, their surfaces are catalyzed by the reaction product of stannous chloride and palladium chloride. Also, preferably, such catalysis is carried out by a two-step process, i.e. by suspending the ceramic powder in an HCl solution of one of the chloride reactants and then in the other. For example, the surfaces of the ceramic powder can be coated with catalyst by first suspending the powder in an aqueous HCl solution of stannous chloride, recovering, washing and drying the powder, and then suspending the powder in an aqueous HCl solution of palladium chloride, recovering, washing and drying the powder. The resulting catalyzed powder is then ready to be electroless plated.

In the present invention electroless plating can be defined as the deposition of a continuous or at least a substantially continuous encapsulating film or coating of metal on substrate particles dispersed in an aqueous plating bath or solution by the interaction of a salt of the metal and a reducing agent. By at least a substantially continuous encapsulating film of metal it is meant herein that there is no significant exposure of the surfaces of the substrate particles. The present electroless plating bath is comprised of an aqueous solution of a metal salt, a reducing agent, a chelating agent and a pH adjustor. Specifically, the bath contains ions of the metal which are reduced by the reducing agent under certain conditions determinable empirically such as, for example, certain pH and temperatures required for plating. Such plating baths are commercially available. Representative of the salts of nickel and copper which are useful are the nitrates, chlorides and sulfates. Representative of useful reducing agents are sodium hypophosphite and formaldehyde. Representative of useful pH adjustors are sodium hydroxide and hydrochloric acid. Representative of the chelating agents are sodium citrate and potassium sodium tartrate. The specific amount of each dissolved component in the bath depends largely on the rate of plating desired and is determinable empirically. In general, the rate of plating is decreased by decreasing the metal ion concentration of the solution, decreasing the pH, decreasing the temperature, and decreasing the amount of substrate particles suspended in the plating bath.

The catalyzed substrate particles are dispersed in the plating bath and kept in suspension therein until the encapsulating metal is of the desired thickness suitable for fabricating the coated powder into the desired electrode for a molten carbonate fuel cell. The particles can be kept in suspension by a number of techniques such as, for example, by stirring the bath or bubbling a gas therethrough which has no significant deleterious effect on the plating process. As a minimum, plating of the particles should be carried out to produce metal encapsulated particles wherein the encapsulating metal is at least substantially continuous and at least sufficiently thick so that they can be sintered together by the encapsulating metal without significantly exposing the surface of the substrate particles.

The powder of the present invention, i.e. the metal-encapsulated substrate particles, can be fabricated into an electrode useful for a molten carbonate fuel cell by a number of techniques. For example, the present electrode powder can be deposited on an appropriate substrate in the form of a layer or plaque and sintered at a temperature at least sufficient to sinter the contacting electrode powder particles by means of metallic bonds or necks formed by the encapsulating metal without significantly exposing the surfaces of the substrate particles. The specific thickness and density of the deposited layer of powder or plaque depends largely on the desired structure of the sintered body, i.e. electrode. Usually, for nickel and copper, such a temperature ranges from about 800° C. to about 1000° C. Such sintering should be carried out in an atmosphere in which the metal-encapsulated particles are substantially inert. Specifically, the substrate, the sintering atmosphere and sintering temperature should have no significant deleterious effect on the present powder. Representative of such an atmosphere is argon, hydrogen and a vacuum. The resulting sintered body is of substantially the same shape and porosity, i.e. pore volume and pore size, as the unsintered layer or plaque.

The present electrode, i.e. sintered body, usually is in the form of a plate and has a pore volume greater than about 40% but less than about 85% by volume of the electrode. Preferably, the present electrode has a pore volume greater than about 50%, since the higher the surface area and pore volume of the electrode, the better its performance. The specific pore volume and pore size or pore size distribution is determinably empirically and depends largely on the porosity of the matrix supporting the carbonate electrolyte as well as the operating conditions of the cell. For best results, the electrode should have a pore volume and pore size distribution which allow enough electrolyte to enter the electrode to accomplish reaction but not so much as to "flood" the electrode to the point where the reacting gas cannot diffuse rapidly to the reaction sites of the electrode. Small pores retain electrolyte in preference to large pores. In order for an electrode to perform well it must take up enough electrolyte to allow the cell reaction; yet it must not take up so much electrolyte that the gas cannot diffuse rapidly to and from the reaction site. Preferably, therefore, the electrode should have some percentage of pores which are smaller than pores in the electrolyte matrix "tile" to retain electrolyte and a larger percentage of pores which are greater than pores in the tile so as to remain dry. Generally, the pores in the electrode range in size from about 0.1 micron to about 20 microns, and frequently they range from about 2 microns to about 10 microns. Suitable surface areas are attained with an electrode ranging in thickness from about 0.005 inches to about 0.050 inches. Preferably, the plate-like electrode is in the form of about a 4 inch square.

The invention is further illustrated by the following examples:

EXAMPLE 1

In this example strontium titanate ($SrTiO_3$) particles having an average particle size of 0.5 micron were electroless plated with nickel. The $SrTiO_3$ powder is white in color.

About 250 ml. of an aqueous solution composed of 10 grams/liter $SnCl_2$ and 40 ml./liter HCl was prepared for sensitizing the surfaces of the $SrTiO_3$ powder. About 0.2 grams of $SrTiO_3$ powder were suspended in the sensitizing solution by means of a magnetic stirring bar for 15 minutes at room temperature. The suspension was then filtered, washed with distilled water and dried in air at room temperature.

About 250 ml. of an aqueous activating solution of 4 grams/liter $PdCl_2$ with a pH adjusted to pH 3 with HCl was used. The sensitized $SrTiO_3$ powder was suspended in the activating solution with a magnetic stirring bar at room temperature for about 15 minutes, then filtered, washed with distilled water and dried in air at room temperature producing catalyzed $SrTiO_3$ powder.

A commercially available plating solution sold under the trademark Enthone Enplate Ni410A&B wherein solution A contained nickel salts and solution B contained reducing agent was used.

In the present example, 50 ml. of a plating solution was used comprised of 12.50% by volume of solution A, 6.25% by volume of solution B and 81.25% by volume of distilled water. Specifically, solution A was initially mixed with the distilled water producing a green solution of pH 4+. The resulting solution was heated to 190° F. and maintained at 190° F. throughout plating. The 0.2 gram sample of sensitized activated $SrTiO_3$ powder was suspended in the hot solution by means of a magnetic stirring bar and maintained in suspension throughout plating. After about 20 minutes of mixing, the reducing agent, i.e. solution B, was added to the suspension slowly. Within a few minutes, visible reaction occurred as evidenced by the initially white-colored $SrTiO_3$ particles turning a gray color and by the evolution of $H_2$ gas. Plating reaction was completed after about 2 hours. Reaction completion was evidenced by the absence of $H_2$ gas bubbling in the solution and the reduction in the intensity of the green color of the nickel plating solution to near colorless. The nickel plated $SrTiO_3$ particles were filtered from the solution, washed with distilled water and dried in air at room temperature.

The nickel encapsulated particles were free flowing, grey in color and contained elemental nickel in an amount of 49.1% by weight of the total weight of the nickel encapsulated particles. Example 1 is illustrated in Table I.

The procedure used in the tabulated examples of Table I was substantially the same as that disclosed in Example 1 except as noted in the Table. In Table I, the plating solution, when given as concentrated had the same composition as the plating solution disclosed in Example 1. The plating solution, when given as a ratio, is the ratio of parts by volume of the plating solution disclosed in Example 1 to parts by volume of distilled water and their pH was adjusted by addition of sodium hydroxide. In Examples 12-14, the spent plating solution of Example 9, i.e. the plating solution remaining after plating was completed in Example 9, was used. The $SrTiO_3$ powder was the same as that disclosed in Example 1. In Table I, the work load is the concentration of the sample $SrTiO_3$ powder suspended in the plating solution. The weight % nickel in the product is based on the total amount of nickel encapsulated powder.

The procedure used in this example was substantially the same as that set forth in Example 1 except that 3 grams of $SrTiO_3$ powder were used and the plating solution was composed of 1000 ml. of an aqueous solution of 15 grams/liter of copper nitrate, 10 grams/liter of sodium bicarbonate, 30 grams/liter of potassium sodium tartrate, 20 grams/liter of sodium hydroxide and 100 ml./liter of formaldehyde (37%). The plating solution had a pH of 11.5 and plating temperature was 75° F.

Visual examination of the plated particles showed no evidence of the white color of the $SrTiO_3$ powder indicating that the particles were encapsulated with at least a substantially continuous film of elemental copper. The copper encapsulated particles were free flowing, coppery in color and contained elemental copper in an

TABLE I

| Example No. | Plating Solution | | | | | Work Load (gm/liter) | Product | |
|---|---|---|---|---|---|---|---|---|
| | Concentration | Temperature (°F.) | pH | Volume (ml) | $SrTiO_3$ (g) | | Plated Color | Encapsulating Nickel (wt % Ni) |
| 1 | concentrated | 190 | 4+ | 50 | ~0.2 | ~4.0 | dark grey | 49.1 |
| 2 | 1:1 | 190 | 5− | 50 | 0.2 | 4.0 | dark grey | 22.8 |
| 3 | 1:3 | 190 | 4+ | 50 | 0.2 | 4.0 | dark grey | 18.9 |
| 4 | 1:3 | 190 | 2 | 50 | 0.2 | 4.0 | dark grey | 10.0 |
| 5 | 1:3 | 188 | 4 | 1250 | 5.0 | 4.0 | | 8.3 |
| 6 | 1:2 | 190 | 4− | 1250 | 5.0 | 4.0 | black | 15.5 |
| 7 | concentrated | 194 | 4+ | 1500 | ~6 | ~4.0 | black | ~45 |
| 8 | 1:1 | 195 | 4 | 1000 | 5.0 | 5.0 | light grey | 25.0 |
| 9 | 1:1 | 195 | 5 | 2000 | 10.0 | 5.0 | light grey | 17.9 |
| 10 | 1:1 | 195 | 5 | 1000 | ~6 | ~6.0 | light grey | 31.6 |
| 11 | 1:1 | 195 | 5 | 1000 | ~6 | ~6.0 | light grey | 29.5 |
| 12 | spent of Ex. 9 | 195 | 4 | 250 | 1.5 | 6.0 | dark grey | 33.7 |
| 13 | " | 195 | 4 | 250 | 1.5 | 6.0 | dark grey | 58.7 |
| 14 | " | 195 | 4 | 250 | 1.5 | 6.0 | dark grey | 31.6 |

Examples 1-14 illustrated the present invention. The nickel encapsulated powders produced in each example were free flowing.

Examination by Scanning Electron Microscopy of the plated particles produced in Examples 1-3 showed them to be encapsulated with a continuous or at least a substantially continuous film of elemental nickel.

Visual examination of the plated particles produced in each of Examples 1-14 showed no evidence of the white color of the $SrTiO_3$ powder indicating that the substrate particles were encapsulated with at least a substantially continuous film of elemental nickel.

EXAMPLE 15

The procedure used in this example was substantially the same as that set forth in Example 1 except that 3 grams of the $SrTiO_3$ powder were used, and the plating solution was 1000 ml. of an aqueous solution of 30 grams/liter of nickel chloride, 100 grams/liter of sodium citrate, and 10 grams/liter of sodium hypophosphite. The plating solution was adjusted to a pH of 8-10 by sodium hydroxide.

Visual examination of the plated particles showed no evidence of the white color of the $SrTiO_3$ powder indicating that the substrate particles were encapsulated with at least a substantially continuous film of elemental nickel. The nickel encapsulated particles were free flowing, grey in color and contained elemental nickel in an amount of 37.1% by weight of the total amount of nickel encapsulated $SrTiO_3$ particles.

EXAMPLE 16

In this example elemental copper was plated on $SrTiO_3$ powder.

amount of 55.5% by weight of the total amount of copper encapsulated particles.

EXAMPLE 17

The procedure used in this example was substantially the same as that set forth in Example 16 except that the substrate particles were α-alumina. Specifically, 3 grams of α-alumina having an average particle size of 1 micron were used. The α-alumina powder was off-white in color.

Visual examination of the plated particles showed no evidence of the off white color of the α-alumina powder indicating that the particles were encapsulated with at least a substantially continuous film of elemental copper. The copper encapsulated α-alumina particles were free flowing and contained elemental copper in an amount of 56.9% by weight of the total amount of copper encapsulated α-alumina particles.

EXAMPLE 18

A substantially equivalent amount of each of the nickel encapsulated $SrTiO_3$ powders produced in Examples 1-4, as well as the $SrTiO_3$ powder alone, was compressed in the same manner in a steel die at room temperature under a pressure of about 2000 psi. Each of the resulting pellets was analyzed by mercury porosimetry to determine pore size. The results are shown in FIG. 1. Specifically, FIG. 1 shows that as the thickness of the encapsulating nickel increases, the average pore size is displaced towards larger pores and a broader pore size distribution.

EXAMPLE 19

2.1 grams of the nickel encapsulated powder produced in Example 12 was spread smooth in the form of a layer on a substrate of laminated graphite sheet ("Grafoil") 0.005 inch thick and about 4 inches square covering the substrate. The sides of the substrate were shimed with "Grafoil" sheet to 0.005 inch to produce the desired electrode thickness of 0.005 inch. The side shims also acted as a guide for obtaining a smooth top surface of the powder.

The top surface of the layer of powder was then covered with a layer of "Grafoil" sheet, 0.005 inch thick, and was sized to fit inside the shims. This covering sheet was then externally weighted to create a downward force on the powder during sintering. The resulting structure was fired at 1000° C. in an atmosphere of $H_2$ for one hour and then allowed to furnace-cool to room temperature. The resulting sintered body of nickel encapsulated $SrTiO_3$ was in the form of a plate, rigid and self-supporting.

Optical examination of the sintered body showed that it was bonded together by nickel bonds and that the surfaces of the substrate particles were not exposed.

The sintered plate was 0.005 inch thick and about 4 inches square. Based on other experiments carried out in substantially the same manner, it was estimated that it had a pore volume of about 50% by volume of the sintered body and had an average pore size of about 0.5 micron.

The sintered body could be cut into a 4 inch square, and in such form it would be useful as an electrode in a molten carbonate fuel cell.

What we claim as new and desire to secure by Letters Patent of the United States is:

1. An electrode useful for a molten carbonate fuel cell consisting of metal encapsulated substrate particles sintered together only by means of said metal without significant exposure of the surface of said substrate particles, said electrode having a pore volume greater than 40% by volume but less than 85% by volume of the electrode, said electrode having a pore size ranging from about 0.1 micron to about 20 microns, said metal being selected from the group consisting of copper and nickel, and said substrate particles being selected from the group consisting of lithium aluminate, strontium titanate, α-alumina and mixtures thereof, said substrate particles ranging in size from about 0.1 micron to about 100 microns.

2. An electrode according to claim 1 which has a plurality of pore sizes.

3. The electrode of claim 1 wherein said substrate particles are of distributed size and said metal encapsulated particles are of distributed size wherein the thickness of said encapsulating metal is substantially the same.

4. The electrode of claim 1 wherein said substrate particles are all substantially the same size and wherein said encapsulating metal is in a range of thicknesses and said metal encapsulated particles are of distributed size.

* * * * *